United States Patent

Buchkremer et al.

[11] Patent Number: 5,973,807
[45] Date of Patent: Oct. 26, 1999

[54] LARGE DISPLAY COMPOSITE HOLOGRAMS AND METHODS

[75] Inventors: Hermann-Stephan Buchkremer, Wartburgstrasse, Germany; Uwe Rockenfeller, Boulder City, Nev.

[73] Assignee: Rocky Research

[21] Appl. No.: 08/974,583

[22] Filed: Nov. 19, 1997

Related U.S. Application Data

[62] Division of application No. 08/428,894, Apr. 25, 1995, Pat. No. 5,734,485.

[51] Int. Cl.$^6$ ........................................................ G03H 1/30
[52] U.S. Cl. ............................... 359/25; 359/22; 359/26; 359/32
[58] Field of Search .................................. 359/1, 15, 22, 359/25, 26, 32, 33

[56] References Cited

U.S. PATENT DOCUMENTS

| | | |
|---|---|---|
| 4,175,750 | 11/1979 | Rugheimer et al. . |
| 4,429,947 | 2/1984 | Benton . |
| 4,445,749 | 5/1984 | Benton . |
| 4,595,252 | 6/1986 | Lorimer . |
| 4,601,533 | 7/1986 | Moss . |
| 4,703,994 | 11/1987 | Leib et al. . |
| 4,795,223 | 1/1989 | Moss .......................................... 359/24 |
| 4,830,445 | 5/1989 | Robinson . |
| 4,885,193 | 12/1989 | Head . |
| 4,889,780 | 12/1989 | Cosner . |
| 5,020,882 | 6/1991 | Makow . |
| 5,103,325 | 4/1992 | Andrews et al. . |
| 5,111,313 | 5/1992 | Shires . |
| 5,122,888 | 6/1992 | Iizuka et al. . |
| 5,142,384 | 8/1992 | Wood et al. . |
| 5,161,979 | 11/1992 | Sekiguchi . |
| 5,191,449 | 3/1993 | Newswanger . |
| 5,223,357 | 6/1993 | Lovison . |
| 5,455,692 | 10/1995 | Wreede . |
| 5,473,447 | 12/1995 | Molteni et al. . |

FOREIGN PATENT DOCUMENTS

| | | |
|---|---|---|
| 0240227 | 3/1987 | European Pat. Off. . |
| 0 544 251 A1 | 6/1993 | European Pat. Off. . |
| WO 94/24615 | 10/1994 | WIPO . |

OTHER PUBLICATIONS

*The Complete Book of Holograms, How They Work and How To Make Them*. By J. Kasper and S. Feller, J. Wiley & Sons, Inc., 1985, pp. 146–152.

*Primary Examiner*—Cassandra Spyrou
*Assistant Examiner*—Darren E. Schuberg
*Attorney, Agent, or Firm*—Knobbe, Martens, Olson & Bear, LLP

[57] ABSTRACT

A composite hologram comprises a plurality of hologram tiles arranged for display, each of said hologram tiles formed by exposing each of a plurality of different unexposed photographic plates simultaneously to light scattered by an intermediate hologram using a conjugate complex of a first reference wave from a coherent light source and to a second reference wave from said coherent light source.

17 Claims, 4 Drawing Sheets

LARGE DISPLAY COMPOSITE HOLOGRAMS AND METHODS

This application is a divisional of U.S. patent application Ser. No. 08/428,894, filed Apr. 25, 1995 not U.S. Pat. No. 5,734,485.

BACKGROUND OF THE INVENTION

Display holograms have become increasingly popular for commercial applications including displays for advertising products or services and the like. The main advantage of holograms compared to other display techniques is the capability of displaying three dimensional and moving scenes. However, the use of holograms for presenting displays on relatively large surface areas such as used for large signs or billboards has heretofore not been practical. A major problem in producing holograms of such sizes, typically several square meters, is the lack of practical techniques for economically making multiple copies of an original hologram. The present invention comprises a process for making relatively large holograms and for a method of reproducing and copying such holograms by an economical and practical process. The invention also includes apparatus for displaying such large holograms.

SUMMARY OF THE INVENTION

The present invention comprises a method for making composite three dimensional still and/or moving scene holograms which can be relatively inexpensively and practically reproduced and displayed in large area signs and billboards. The invention also comprises a method for producing multi-square meter size magnifications of small objects. In addition, such techniques provide for presentation of large area artificially generated scenes (e.g. computer generated). The invention includes both the method for preparing and reproducing such composite moving scene holograms as well as large composite hologram display apparatus utilizing white, incoherent light for illumination similar to illumination of rainbow holograms. The invention also includes methods for producing master reflection holograms from either reflection or transmission-type intermediate holograms.

DETAILED DESCRIPTION

Figure 1:
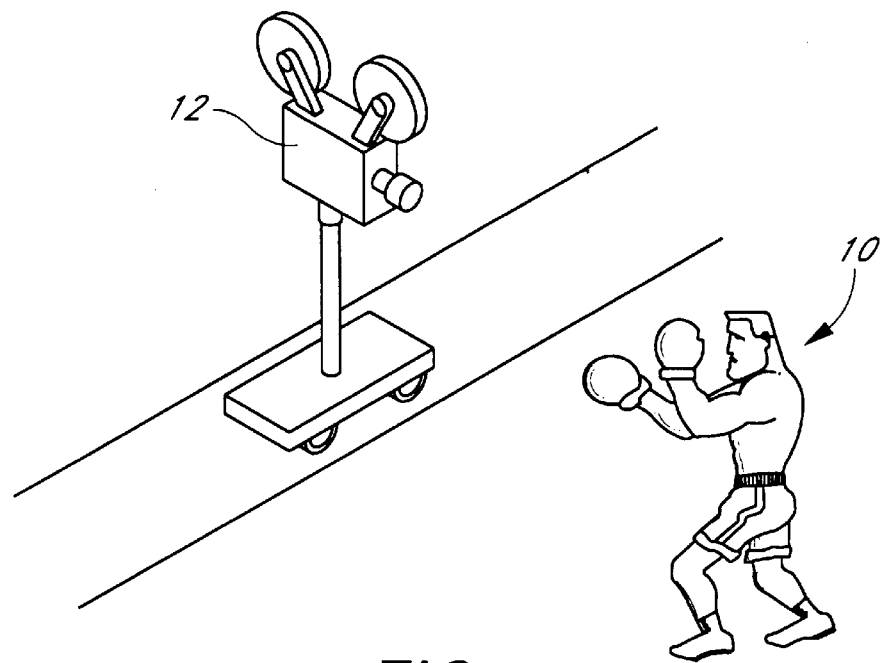
FIG. 1 illustrates filming of a moving three dimensional object for holographic display.

The first step in producing a composite hologram of the invention comprises recording an object, real or animated, to produce a set or series of sequential images. One such method comprises filming a still or moving subject utilizing a conventional movie camera and movie film. The size or type of the film and camera or video equipment is not important nor is the movement of the subject necessarily limited. However, it will be appreciated that because the movement or action of the subject is to be shown on a stationary billboard and the extent of the movement will be viewed by an observer normally moving generally parallel to the billboard face from one end of the to the other, the length of the movie film and the amount of movement required by the subject will likely be limited to the time it typically takes the observer to pass by and observe the sign or billboard. In addition, of course, it will also be understood that for many advertising display purposes, only a limited movement of the subject including any product or other visual expression desired to be displayed in the advertisement may be similarly limited, and correspondingly the amount of time and film exposure required in the filming process similarly determined. Thus, for example, where the scope of the holographic display is to show a boxer or segment of a boxing match, or for example, of a person opening a can of beer or soft drink, pouring it into a container, and drinking, during the time required for a viewer or observer to pass by, the length of the film, i.e., the length of the exposure time required to film that action, will be determined. In FIG. 1, a movie camera 12 is shown moving along a track or path as it films a boxing match 10. It will also be understood that the specific object, subject, movement, product display, etc. is not limited in any way by the invention, and that shown in the drawing is for the purpose of illustration only. Additionally, the movement of the camera is also not critical, and instead of moving the camera 12 along a path or track, the camera may be fixed and instead, only the subject may move, with the stationary movie camera recording the moving subject or object to show the desired sequence. The film strip may also be of a stationary subject, with or without camera movement for any portion of the filmed sequence. Combinations of moving and stationary camera filming of stationary and moving subjects may also be used. Alternatively, the film strip may be produced using other techniques, such as computer animation or other electronic, opto-electronic, chemical or video methods. Thus, the scope of the invention is not limited to holographic displays of real or actual objects or subjects, and any suitable methods for producing or obtaining a series of sequential images may be used. Moreover, combinations of actual and animated subjects may be used on the film, moving and/or stationary. Although preparation of a film strip for storage and for use in projecting sequential images may be more practical or preferred, other storage means on any suitable transmission or reflective media for example, liquid crystal devices or other electronic phase modulating systems, may be used.

Figure 2:
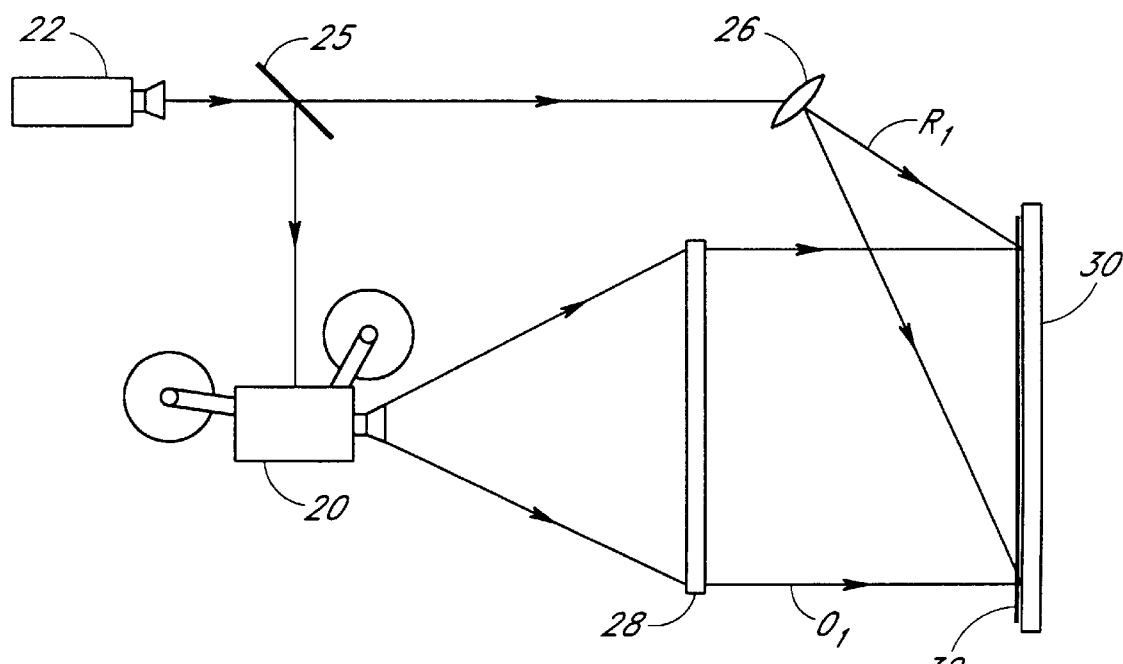
FIG. 2 schematically illustrates a method for preparing an intermediate transmission hologram $H_1$ of the filmed object.

In FIG. 2, there is illustrated a method of preparing a intermediate transmission hologram of the filmed action taken in the example shown in FIG. 1. In the drawing, projector 20 is shown projecting the film on a screen 28. The particular screen is not critical, other than it should adequately reflect or direct the light passing through the film and from the projector lens as the frames of the film are sequentially exposed to the light. Moreover, the screen may not influence the polarization of the source. In preparing the intermediate hologram, a coherent light source is required. Typically, a suitable light source is a laser 22 capable of generating the required coherent or synchronized beam of light, which is highly monochromatic, i.e., is nearly of a single wavelength. Suitable lasers include He—Ne, Ar, etc. gas or solid state lasers commonly used for preparing holograms, as is understood by those skilled in the art.

The light beam from the laser 22 is first directed to a beam splitter 25 whereby a portion or part of the beam is directed to a lens 26 for projection onto an unexposed photographic plate or plates 30 and the other portion to the projector 20 for illuminating the film as it is directed through the projector. It is important that the two components of light that are directed to the unexposed photographic plate or plates 30 come from a single coherent light source. As represented in FIG. 2, both the reference wave $R_1$ from the laser and the object wave $O_1$ reflected from the projection screen 28 are directed to the same surface of the unexposed photographic plate 30. The aforesaid selection and arrangement of optical components is by way of example only, and different lens and lens combinations, focusing mirrors and the like may be used, and holographic optical elements may be substituted for glass lens.

Figure 3:
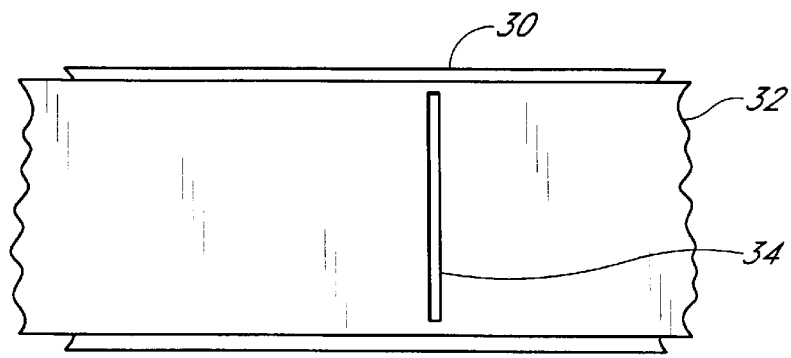
FIGS. 3 and 4 are front views of an intermediate hologram and a mask having a vertical slit aperture used in the preparation thereof.

Observing also FIG. 3, at the time of the exposure in preparing the intermediate hologram, a mask 32 having a narrow vertical slit 34 is placed in front of the unexposed photographic plate surface and moved in front of and parallel with the unexposed plate surface in sequence with the projection of each individual frame of the movie film being projected from the projector and screen. As also shown in FIG. 3, the slit 34 is very narrow, preferably about 0.1–1 mm. The specific slit width value selected will depend on several parameters such as the number of movie frames to be used, horizontal dimension of the view field, aperture size and distance between human eyes, and the like. The height of the slit and therefore the height of the intermediate hologram is not particularly critical. However, the height of the slit determines the final vertical observation range. Thus, if the slit is 10 cm high, an observer will have a maximum ±5 cm vertical (up and down) observation range. Generally, a slit height of between about 1 mm and about 50 cm is suitable. The important feature of the projection and exposure of the film onto the unexposed photographic plate 30 is the synchronized movement of the mask 32 so that each film frame is exposed through the slit on an unexposed photographic plate or surface area of a photographic plate with sequential frames sequentially exposed on adjacent plates or areas.

Figure 4:
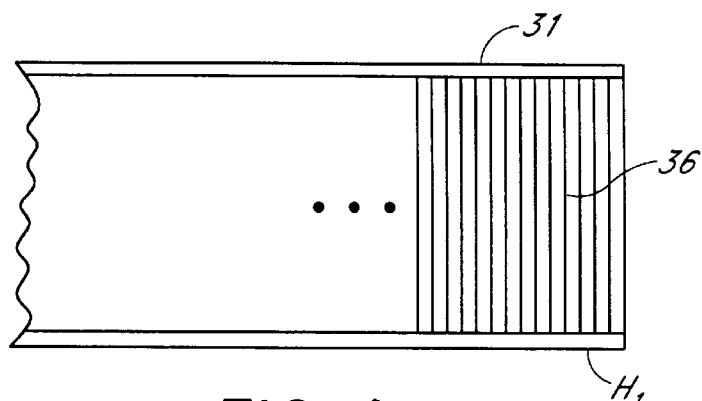

FIG. 4 illustrates an exposed and developed photographic plate 31 from the unexposed photographic plate 30 illustrated in FIG. 3, with the plurality of side-by-side images 36 which have been developed to compose the intermediate hologram $H_1$. Each strip image 36 represents a different frame of the filmed subject. The entire edge to edge length of the intermediate hologram, which is composed of a plurality of developed plates 31, will depend primarily on the number of frames required to film the action of the subject so that the entire desired sequence of movement of the subject and/or movement of the camera, is present in the intermediate hologram. In other words, the start and end point of the desired sequence must be recorded in the film and sequentially exposed between the ends or edges of the intermediate hologram.

The specific type of projector used is one in which conventional illumination sources are removed and replaced with appropriate laser beam carriers, i.e., fiber optics, with suitable focusing and filter components. Video equipment may be used, for example, a TFT (thin film transistor) liquid crystal projector may be suitable. Polarization foils of the liquid crystal elements may need to be replaced by high quality foils and elements, as determined and selected by those skilled in the art. The optical arrangement for projection should also allow for scaling, i.e., the use of various projection sizes. The projection screen should be selected for minimal speckle noise and minimal distortion of the polarization state.

The intermediate hologram $H_1$ may consist of smaller, unexposed photographic plates which are aligned horizontally in a suitable frame or fixture. Thus, the use of readily commercially available unexposed photographic plates is intended, and is preferred. Again, these individual plates are aligned horizontally, end to end, with the appropriate number used to provide for fully exposing the desired length of film needed to show the intended action sequence. However, any suitable unexposed emulsion surface may be used to prepare the intermediate hologram.

Exposure on the unexposed photographic plate or plates 30 typically starts with projection of the first image of the video or film sequence at the left or right edge of the first plate. The mask 32 with slit aperture 34 is moved horizontally by exactly one slit width for each and every sequential image until the opposite or other end of the final photographic plate or plates 30 is reached with recording of the final image of the desired sequence.

The slit width of the aperture 34 may be determined by the total width of the holographic tile field divided by the number sequential images or frames. The distance between the vertical centerline of two adjacent exposed strips should not exceed the distance of the penetration points through the hologram plane of the center point beams of both eyes viewing a point adjacent to the hologram plane. This value is a function of the dimensions of the object, the distance between the object and the hologram plane, and the distance between the viewer and the holographic tiles. As a practical matter, the minimal distance is usually not smaller than the resolution of the eye and is not greater than the distance between the eyes. Space between adjacent strips (dead space) is also to be minimized. Thus, the intermediate hologram $H_1$ is composed of a series of vertical slit holographic images 36 on an elongated plate or side-by-side plates and accordingly is very long and relatively narrow as illustrated in FIGS. 4 and 6.

Following the exposure and development of the intermediate hologram $H_1$, a master hologram $H_2$ is prepared. Observing FIG. 5, a second unexposed photographic plate 40 is placed at a suitable distance from developed photographic plate 31. The distance between the two plates, i.e., between intermediate hologram $H_1$ and the second unexposed photographic plate 40 may not be critical, but preferably is about or generally at the distance between a viewer or observer of the final billboard surface and the display surface. However, this may not be practical where substantial dimensions or distances are required, it being understood that the exposure required to make the master hologram from the intermediate hologram may be somewhat more limited, and will depend on the facilities available.

Figure 5:
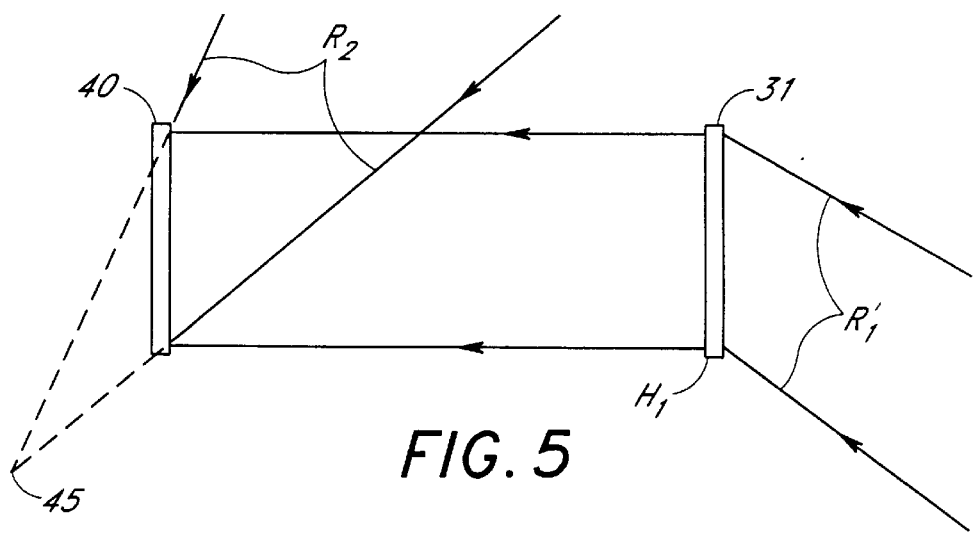
FIG. 5 schematically illustrates the method for preparing a master transmission hologram from the intermediate hologram.

In exposing the unexposed photographic plate or plates 40 to the intermediate hologram $H_1$, a single coherent light source must be used. One light beam to be used is $R_1^*$, the conjugate complex to $R_1$, which was the reference wave used in preparing the intermediate hologram $H_1$ shown in FIG. 2. The conjugated complex $R_1^*$ is counterpropagating to reference wave $R_1$, and is a converging wave focused to a point corresponding to the same position relative to intermediate hologram $H_1$ as was the position of lens 26 relative to unexposed photographic plate 30 as shown in FIG. 2. As shown in FIG. 5, the light of converging reference wave $R_1^*$ is diffracted from intermediate hologram $H_1$ to the unexposed photographic plate 40. Simultaneously, a reference wave $R_2$ from the same laser, also a converging wave, is exposed to the same surface of photographic plate 40. $R_2$ is focused to point 45, which location is important for positioning a white light for illuminating the composite hologram billboard.

Figure 6:
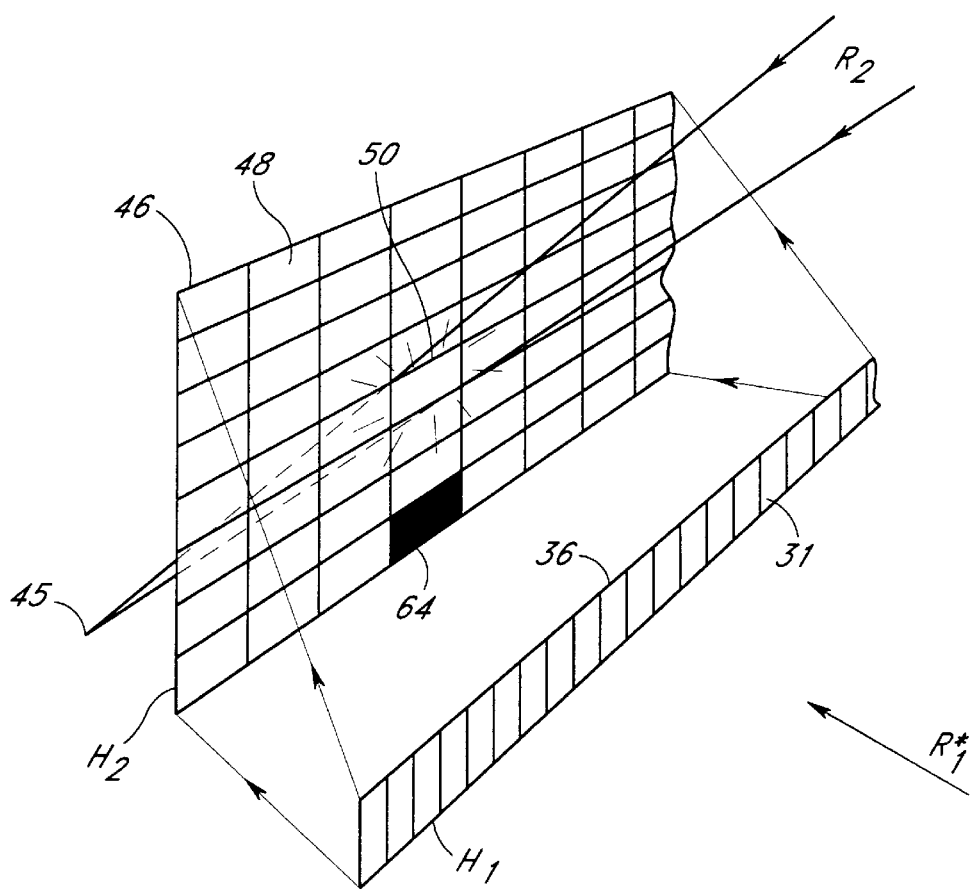
FIG. 6 illustrates the step of the invention for preparing individual component tiles of a composite master hologram incorporating the techniques of FIG. 5.

In FIG. 6, the specific arrangement of a plurality of tiles 48 comprising unexposed photographic plates are secured and arranged in a frame or fixture 46 in producing the composite master hologram according to the invention. Viewing FIG. 6 in the context of the method shown schematically in FIG. 5, a plurality of individual tiles 48, preferably readily commercially available photographic plates, are secured in respective positions in the fixture 46. The tiles 48 are secured so that they will not move during exposure and all remain in the same plane in which copies of those tiles are to be placed in a fixture of a billboard frame for being viewed and observed for public display. The intermediate hologram $H_1$, again comprising the plurality of vertical slit hologram exposures 36 on a plurality of horizontally aligned plates 31, is positioned relative to the plurality of arranged unexposed photographic plates as was intermediate hologram $H_1$ relative to unexposed photographic plate or plates 40 shown in FIG. 5.

As shown in the schematic illustration of FIG. 6, the entire hologram $H_1$ is illuminated by $R_1^*$ and the scattered light hits the entire surface of $H_2$, i.e., all of the unexposed plates 48. As also shown in FIG. 5, reference wave $R_2$, illuminates $H_2$ and is focused to a point 45. However, there are two different methods or techniques that may be used in the alternative for exposing $H_2$ to $R_2$. In a first method or embodiment, the entire surface of $H_2$ is illuminated by $R_2$ and thus all tiles are simultaneously exposed. In a second embodiment which is illustrated, an aperture is used to adapt or limit the area exposed to $R_2$ to a single tile at a time and each unexposed tile or plate is individually exposed to $R_2$ by lifting or removing a cover 64 positioned or secured over each tile, while each of the remaining tiles are covered by a cover or lid to prevent exposure to $R_2$. In the drawing, tile 50 is exposed to $R_2$ and $R_1^*$, and only one cover 64 is shown. The tiles are thus exposed sequentially to the interference created by scattered light from the multiple holograms of $H_1$ and the reference wave $R_2$ apertured to the size of one tile. The sequential exposure of the individual tiles is continued until all tiles have been exposed. The advantage of using the second method or embodiment for exposing the individual tiles in producing the master hologram $H_2$ is that a substantially reduced laser power for $R_2$ is required as compared to a laser power needed for simultaneous exposure of all $H_2$ tiles according to the first embodiment. of course, the second method requires a longer time for individually uncovering and exposing each tile sequentially. The final master hologram is produced by exposure of all of the individual photographic plates 48 and is composed of a plurality of vertical layers of horizontal rows of horizontally aligned tiles or plates. It will be appreciated that the relative size of the individual component plates 48, hologram H, and lens components shown in the drawings, and particularly FIG. 6, are for the purpose of illustration only and are not intended to be dimensionally accurate.

After the master hologram photographic plates have been exposed as described regarding FIGS. 5 and 6, they are developed and copied. Each of the tiles is a common hologram size, and can be copied on conventional hologram copy equipment using conventional copy materials, or hologram copy services may be used. Understanding that the hologram tiles prepared according to the above described method are transmission holograms having a relatively thin light sensitive layer, as compared to reflection holograms having thick light sensitive layers, they are usually copied by a direct front-two-front method. This method comprises placing the tile of the master hologram to be copied next to the copy tile and passing a coherent, monochromatic light through the master hologram tile which is then recorded on the copy hologram. Suitable copy material comprises any readily commercially available photographic plate or light-sensitive material which becomes transparent when developed and which may be relatively inexpensive. After copying, a high brightness may be achieved in the copy utilizing standard bleaching techniques. Multiple copies of each of the master hologram tiles are made as desired or needed.

Figure 7:
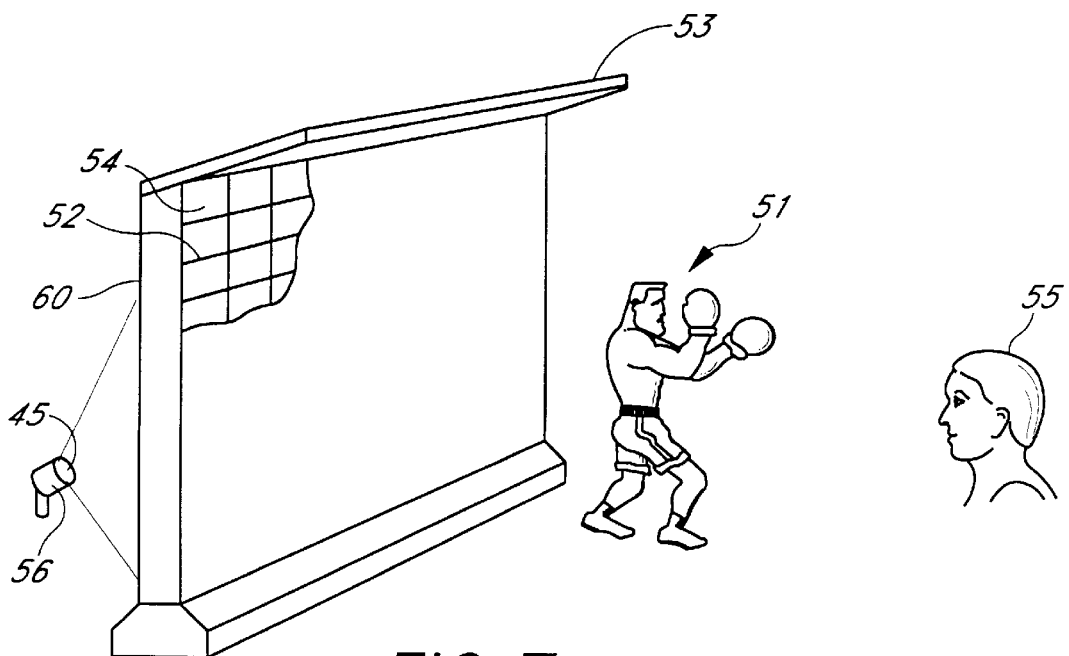
FIG. 7 illustrates an illuminated billboard utilizing tiles copied from a composite master hologram prepared according to the invention.

In FIG. 7 there is illustrated a billboard 60 comprising a plurality of frames 52 in which a copy 54 of each of the master hologram tiles prepared as described hereinabove and illustrated in FIGS. 5 and 6 is secured. Any suitable framework and materials may be used for securing each of the individual copies 54 whereby the copy tiles become positioned and stabilized from significant vibration or movement. The structure of the billboard 60 also preferably includes a cover 53 which is useful for protecting the holographic copy tiles as well as to minimize glare on the hologram surfaces from sunlight. The size and shape of the cover may be formed and modified to suit. The billboard hologram tiles may also be protected against environmental conditions including dust, humidity, and the like using any suitable protective shield such as glass mounted in front of each tile. The glass may also be colored or tinted if not interfering with the color of the hologram to be viewed.

As also illustrated in FIG. 7, the billboard is illuminated utilizing a white incoherent light 56 located in a position 45 corresponding to the focal point 45 of the reference wave $R_2$ used in exposing the master hologram tile as shown in FIG. 5. The light source 56 is on the opposite side of the transmission hologram copy whereby an observer 55 will see the holographic image 51 in front of the billboard. As the observer moves from side to side in front of the billboard, the hologram display will also move as the observer views the different holographic tile copies in the billboard.

The specific wattage or power of the white light 56 required for illuminating the billboard will depend on a number of factors, including the area of the billboard to be displayed, ambient light conditions, and the like as will be understood by those skilled in the art. The white light source is usually a high powered halogen burner, although other suitable light sources may be utilized. Another alternative to utilizing a stationary light source or sources for illuminating the transmission hologram billboard as shown in FIG. 7, comprises using a moving light source. Such moving illumination is particularly effective where the viewer is substantially stationary. In addition, individual fixed light sources may be sequentially switched on and off in such a way as to create an illusion of a moveable light source. Although the billboard illustrated and described above incorporates a composite of copies of the master hologram tiles (plates), if desired, the original master hologram tiles could be used in the billboard and illuminated for display, if desired.

The above-described hologram preparation and display process may be modified to generate and display large area holographic scenes which are matched to different observation heights. Thus, for example, the holographic billboard 60 shown in FIG. 7, may be produced to display scenes to be viewed at a child's height, and different scenes to be viewed at an adult's height, or the same scenes may be matched for display to different observer heights. To produce such a display hologram requires using plurality of film strips each to produce a different intermediate hologram $H_1$. Again, the film strips may be of the same or of different moving scenes. Each intermediate hologram $H_1$ is produced as previously described and shown in FIGS. 2–5. The intermediate holograms are then stacked vertically, i.e., aligned on top of one another, edge to edge, without separation, openings or slits between the rows and are then simultaneously exposed to the reference wave $R_1^*$ as shown in FIGS. 5 and 6.

Figure 8:
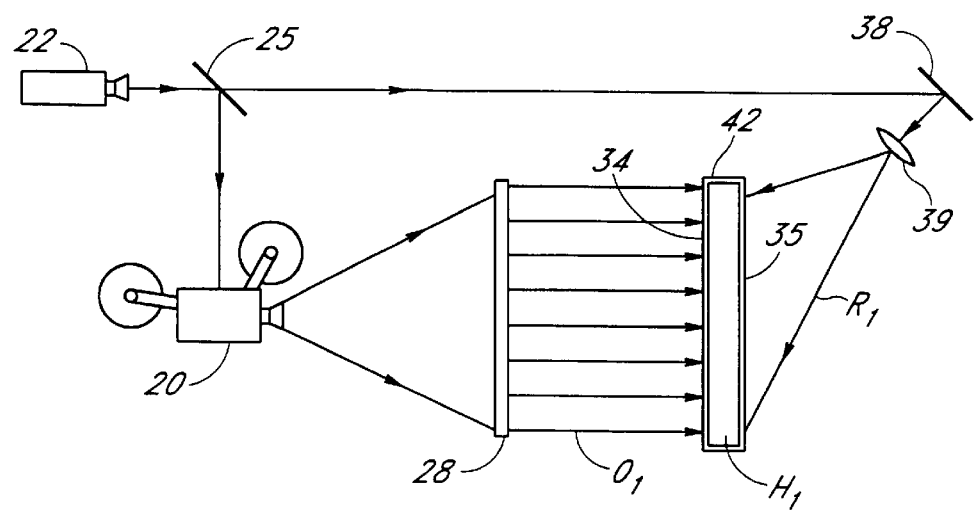
FIGS. 8–10 illustrate methods of producing intermediate and composite master reflection holograms and a billboard incorporating copies of reflection hologram components.
Figure 9:
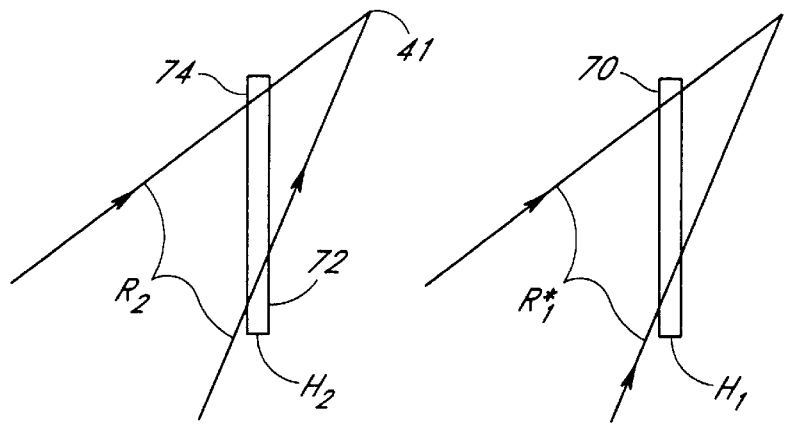
Figure 10:
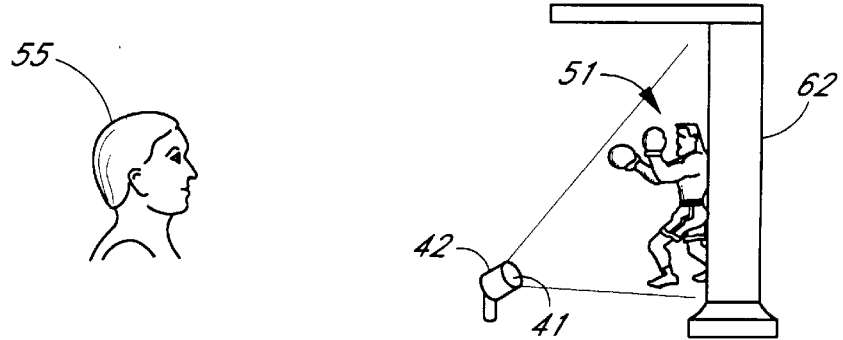

The hologram process described above and shown in FIGS. 2–7 is for producing a transmission hologram, which may be preferred for most uses because of advantages of being less expensive to produce and copy, and less sensitive to weather or ambient conditions. However, it may be desirable to utilize a reflection hologram to make the billboard. Such a technique is illustrated in FIGS. 8–10. FIG. 8 illustrates a method for preparing the thick intermediate reflection hologram $H_1$ whereby the reference beam $R_1$ is reflected via mirror 38 and lens 39 on the opposite side of the hologram surface from that on which the reflection from screen 28 is exposed. Thus, object wave $O_1$ from projection screen 28 is exposed on the opposite side of the unexposed reflection hologram surface from that of the reference wave $R_1$ exposure. Two different techniques may be used to expose the hologram. Where the hologram $H_1$ produced is to be an elongated strip similar to the elongated hologram illustrated in FIGS. 4 and 6, a bridged or bridge shaped mask having opposite vertical slits, i.e., a vertical slit on each side of the mask is used. Thus, observing FIG. 8, bridged mask 42 is provided with elongated vertical slits 34 and 35 on opposite sides of the mask. The size, shape and position of each slit is substantially as shown and described in FIG. 3. To produce the thick intermediate hologram, bridged mask 42 is moved along the unexposed thick hologram while projecting the movie film from projector 20 and exposing one hologram surface to object wave $O_1$ directed from projection screen 28 through slit 34 substantially as previously described regarding FIG. 2. Simultaneously, reference wave $R_1$ is directed to the opposite hologram surface through slit 35. Again, sequential exposure of sequential frames of the movie film, is substantially as previously described.

Where the thick intermediate hologram $H_1$ is to be of nearly the same size (and shape) as the billboard to be produced, a large bridge shaped mask having vertical dimensions, i.e., height, similar to the size of the intermediate hologram (and billboard) is used. Such an enlarged mask will also have a slit on opposite sides of the bridged mask structure through which the projected object wave $O_1$ and reference wave $R_1$ will be exposed, respectively. The advantage of using this second method is that a very large field of view in the vertical direction is achieved.

The thick hologram material used for preparing a reflection hologram is one in which the emulsion depth is substantially greater than the relatively thin transmission hologram previously described. Such differences between material used and the preparation of thin, transmission holograms and thick, reflection holograms are well known to those skilled in the art, are described in available hologram technical books and literature, and need not be further described herein.

Following exposure of the thick hologram $H_1$ and development of the tiles or plates, the master hologram $H_2$ is prepared as shown in FIG. 9. The conjugated complex reference wave $R_1^*$ from a coherent light source is diffracted off of surface 70 of intermediate hologram $H_1$ onto one side 72 of the unexposed thick hologram plate $H_2$ while the reference wave $R_2$ from the same coherent light source is directed onto the opposite side 74 of the thick hologram plate $H_2$ being exposed. Again, reference wave $R_2$ is converging and is focused on focal point 41 which is then used as the position for the white light illuminating source in the illumination of the billboard copy of the hologram. Thus, like the opposite side exposure of intermediate reflection hologram $H_1$ illustrated in FIG. 8, the reflective master hologram $H_2$ as shown in FIG. 9 is prepared by exposing opposite sides of the unexposed master hologram emulsion plate material. Otherwise, the technique used for preparing the intermediate strip hologram and multiple master hologram tiles which form the composite master hologram as previously described for the transmission hologram is used for preparing the reflection master hologram. However, in preparing copies of the thick reflection hologram plates, the copy plate is placed between the master hologram plate and the monochromatic light source. It will be understood that the materials used to copy the reflection hologram are not the off the shelf, relatively inexpensive copy materials used for preparing copies of the transmission hologram as previously described.

Once the copy, or master hologram tiles are developed, they are placed in a suitable frame, substantially like that previously described for securing and displaying the transmission hologram tiles or copies. In FIG. 10, a billboard 62 containing the reflection hologram tiles, whether they be copies or originals, are located, and a light source 42 at position 41 corresponding to focal point 41 in FIG. 9, is provided. Observer 55 will observe the holographic image 51 on the same side of the hologram as the illuminating light source 42. Thus, it will be appreciated that in the reflection hologram billboard, the light source is on the same side as the hologram surface to be observed. Although the reflection holograms are more expensive to produce and copy, and are also more sensitive to environmental conditions than the less expensive transmission hologram copies, they do have an advantage of being somewhat brighter and having a larger field of view. In addition, the multiple or moving lights for illuminating the reflection hologram shown in FIG. 10 may be provided as previously described regarding the transmission hologram billboard.

As a further alternate method, it may also be desirable to produce a final composite reflection hologram without using an intermediate hologram. This may be accomplished by exposing the final composite holographic frame structure, i.e., the plurality of unexposed tiles of $H_2$ in the frame structure, directly to the interference created by the scattered wave reflected from the object and the reference wave $R_2$, i.e., directly recording the interference between the scattered object wave and the reference wave. Thus, instead of forming the intermediate hologram $H_1$ as shown in FIG. 8, the multiple unexposed reflection tiles are placed in the final holographic tile frame structure $H_2$ and these tiles are exposed to the object wave-reference wave interference. Of course, the resulting composite hologram will be limited to an image of the same size as the original object, no moving or animated scenes, and no observer height variation.

The display hologram, regardless of the type, i.e., reflection or transmission, or whether produced from an intermediate hologram or not, may also incorporate non-hologram display components, portions or materials. For example, the display, such as a billboard, may use one or more holograms on a portion of the billboard display area with conventional non-hologram displays used in other portions of the billboard display area. Again, the hologram used in such a combination display may be either a transmission or a reflection hologram, or a combination of such types of holograms. Photographic, lithographic, painted, illustrated, etc., scenes, subjects or objects, as well as different types of illuminated displays are examples of conventional, non-holographic displays that may be combined with one or more of the composite hologram displays. In addition, one portion of the display may show or project motion, i.e., display moving images, while another portion is of stationary objects, or scenes. Preferably, at least a portion of the composite hologram display will include motion such as moving objects or images. Although shooting of a film strip which is developed and projected to produce the holograms has been described and shown in the drawings, as previously disclosed, the invention is not to be so limited and any other techniques such as computer generated scenes and objects for producing recording and projecting sequential images known to those skilled in the art may also or alternatively be used.

Different combinations or sequences of any two or more of the different steps and techniques described herein may also be used to produce a composite hologram of the invention. Moreover, a composite hologram of two or more hologram tiles prepared by other techniques to display a holographic image, with each of the tiles comprising a different segment or portion of the holographic image and composite hologram are within the purview of the invention. Thus, the scope of the invention includes using liquid crystal displays, or other electro-optical modulators, i.e., a Spatial Light Modulator "SLM" for at least a portion of the tiles comprising the holographic display. Moreover, regardless of how the display components, i.e., the figures, subjects or indicia or other information to be displayed is obtained, a processing unit is used for transforming the composite holographic scene into a holographic phase modulating layer comprising the billboard segments or tiles. Such a processing unit also provides the SLM with necessary video signals for forming the billboard segments or display tiles, regardless of the method used for obtaining the visual components to be viewed, whether by filming or other means such as computer generated artificial scenes and the like. Accordingly, the composite holograms of the invention may comprise a combination of the material to be viewed. For example, a portion of the composite may be filmed components, and another portion liquid crystal holograms. Specific examples of such combined composite holograms include the liquid crystal holograms with moving picture hologram displays, fixed or non-moving photographed hologram displays, one or more non-holographic displays, and combined with reflection or transmission holograms. The holograms are also preferably real-time image projection holograms, and thus are viewed by the viewer in real-time images.

Holographic liquid crystal displays of the type intended for use in the present invention are differentiated from presently known liquid crystal displays since in the present application, the diffraction patterns of the scene are displayed rather than the image itself. Additionally, the holographic displays of the present invention, as well as the composite hologram of the invention comprise tiles, i.e., different segments of the recorded and viewed materials. Moreover, depending on the particular type of SLM to be used, a suitable light source ranging from white light incoherent light bulbs, to partial coherent light sources, to single or multi-color lasers are included and may be selected as desired or necessary. The single elements of the SLM or "pixel" must be switched simultaneously for producing interfering light waves. For achieving high resolution liquid crystal holograms the pixel size s and pixel distance d are reduced. The preferred maximum value for s and d is about 50 microns ($\mu$m). Moreover, improved effects and results are obtained if d is decreased to less than 30 $\mu$m and preferably to less than 10 $\mu$m.

We claim:

1. A hologram display apparatus comprising:
   (a) a frame member comprising a plurality of tile supports for securing a plurality of different holographic tiles in edge-to-edge relationship,
   (b) a plurality of hologram tiles secured in said tile supports and forming a composite hologram comprising a plurality of different sequential images with said tiles arranged sequentially in one or more horizontal rows each of said rows forming a visually changing display for being observed by an observer moving generally horizontal and parallel relative thereto and observing said different sequential images, and
   (c) a high intensity incoherent light source for illuminating said composite hologram.

2. The hologram display apparatus of claim 1 wherein said light source is capable of being moved as it illuminates said composite hologram during display.

3. The hologram display apparatus of claim 1 wherein said incoherent light source comprises a plurality of high intensity lamps capable of being sequentially turned on and off while illuminating said composite hologram.

4. The apparatus of claim 3 wherein said plurality of high intensity lamps are arranged for sequentially illuminating different portions of said composite hologram.

5. A hologram display apparatus of claim 1 wherein at least a portion of said hologram tiles comprise reflection holograms.

6. A hologram display apparatus of claim 1 wherein at least a portion of said hologram tiles comprise transmission holograms.

7. A hologram display apparatus of claim 1 wherein said composite hologram comprises combined reflection and transmission holograms.

8. A composite hologram of claim 1 wherein at least a portion of said hologram tiles comprise liquid crystal holograms.

9. A composite hologram of claim 8 in which the display includes a display of moving images.

10. A composite hologram of claim 8 wherein said liquid crystal holograms have a resolution equivalent to a maximum pixel distance of 50 $\mu$m.

11. A composite hologram of claim 8 comprising real-time image projection.

12. A composite hologram of claim 11 wherein said pixel distance is less than 10 $\mu$m.

13. A hologram display apparatus of claim 1 wherein said composite hologram comprises a plurality of horizontal rows of said tiles wherein each of said horizontal rows comprises a separate distinctive hologram having the same or different sequential images whereby each of said separate holograms is capable of being viewed at a different height by said observer.

14. A composite hologram comprising a plurality of different hologram tiles comprising a combination of reflection and transmission holograms and arranged to display one or more holographic images, and wherein each of said hologram tiles comprises a different segment or portion of said one or more holographic images.

15. A display comprising one or more composite holograms of claim 14 combined with one or more non-holographic displays.

16. A composite hologram of claim 14 wherein a portion of said hologram tiles comprise liquid crystal holograms.

17. A composite hologram of claim 16 wherein said liquid crystal holograms have a maximum pixel size of 50 $\mu$m and a maximum pixel distance of 50 $\mu$m.

* * * * *